Patented Oct. 31, 1933

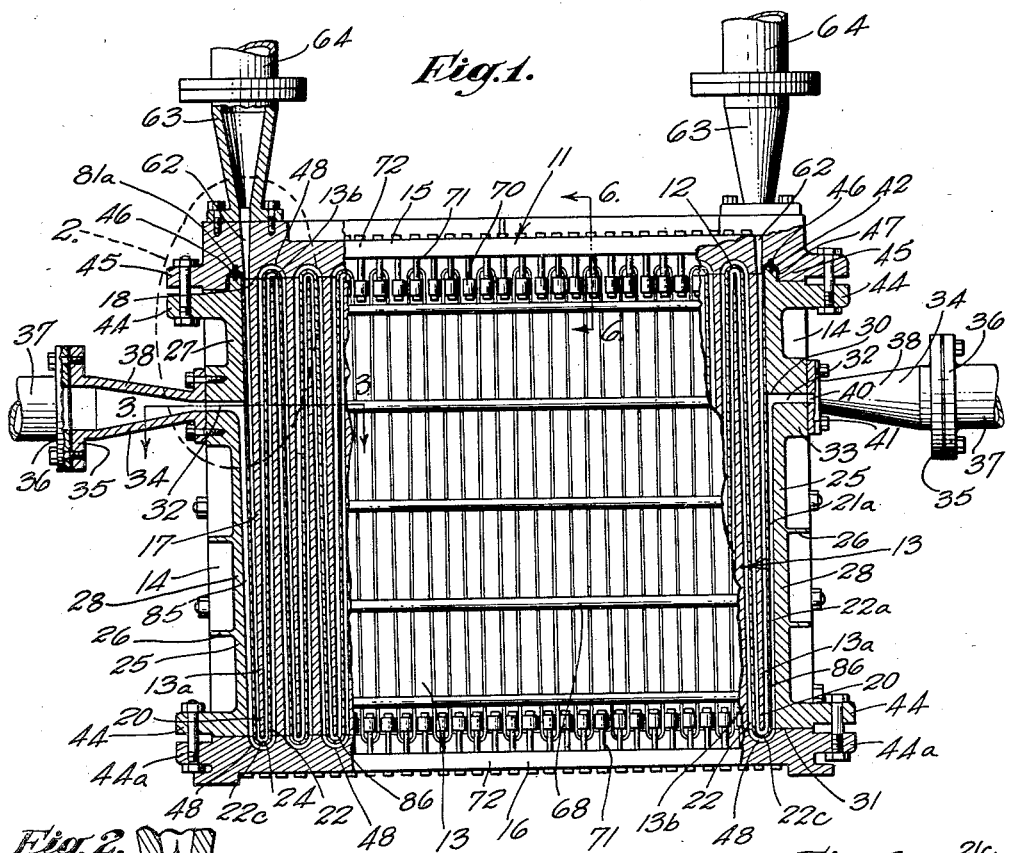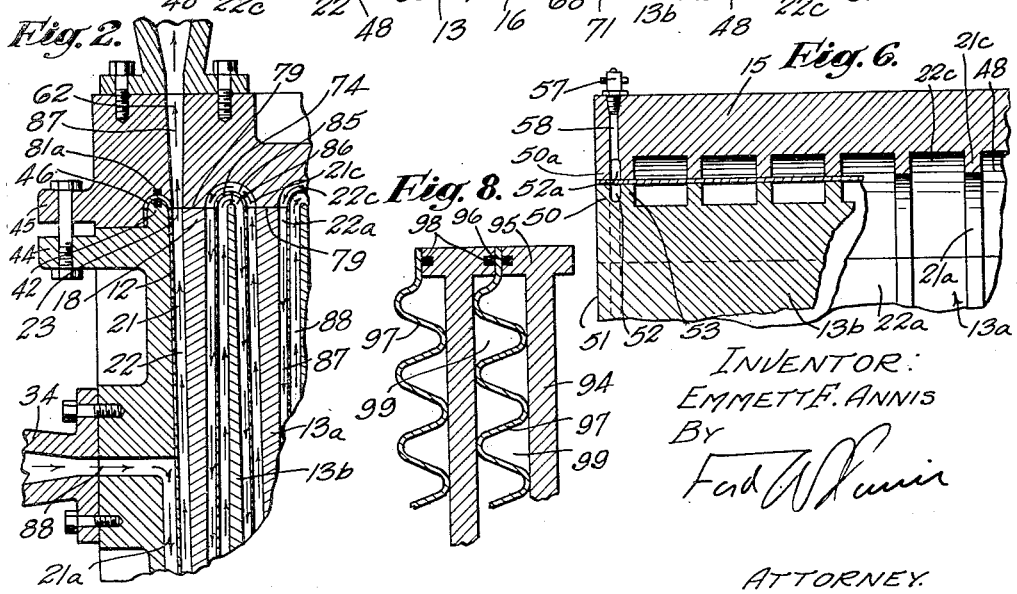

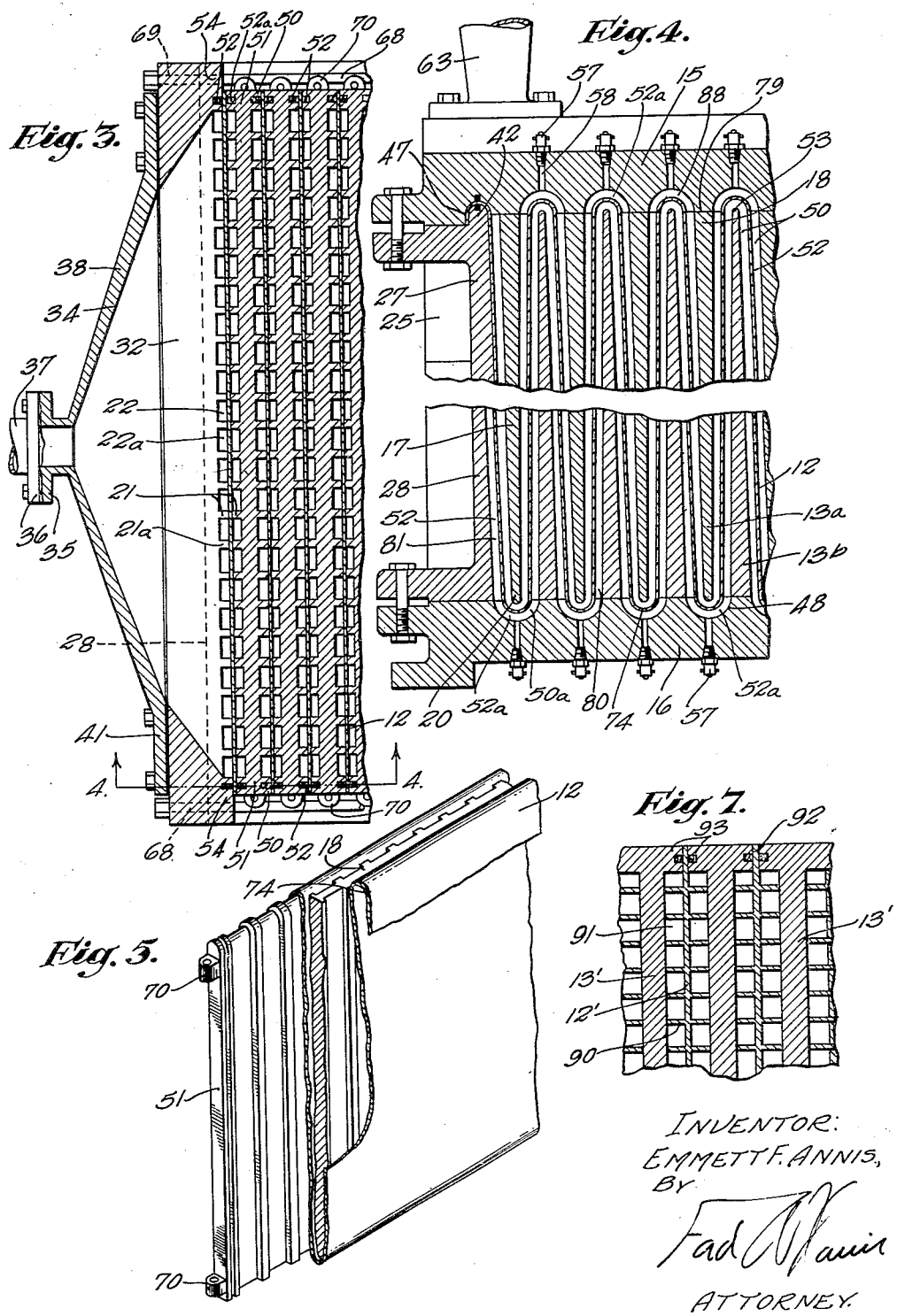

1,932,950

UNITED STATES PATENT OFFICE 1,932,950

HEAT EXCHANGER

Emmett F. Annis, Glendale, Calif.

Application August 22, 1931. Serial No. 558,646

9 Claims. (Cl. 257—223)

My invention relates to heat exchanging devices which are employed to transfer heat from one fluid to another without contact or intermixing of the fluids, and relates particularly to a heat exchanger in which the fluids are conducted through paths which lie parallel to each other and through which paths the fluids may be conducted either in uni-flow or counter-flow relationship.

The principle of heat exchange between two fluids by bringing them into contact with opposite sides of a wall of conductive material, such as metal, is well known, and many types of heat exchangers have been made; but, those heat exchangers now found in general use consist principally of metal tubes for one fluid conducted through a space for containing another fluid. My invention comprehends a heat exchanger of simple and inexpensive form by which a high rate and efficiency of heat exchange may be obtained from a relatively small and compact structure.

It is an object of my invention to provide a heat exchanger in which a thin stream of fluid is conducted in contact with a thin, flat metal sheet of high heat conductivity.

It is a further object of the invention to provide a heat exchanger employing, as a heat conductive member between fluids, a thin metal sheet of considerable breadth and length, this thin sheet being reinforced in such a manner that a relatively high pressure difference in the fluids on the opposite sides thereof may be maintained.

It is a further object of the invention to provide a heat exchanger of the above character in which the thin heat conductive sheet is supported by plates having flow channels therein divided by coextensive walls or ribs which engage opposite sides of the heat conductive sheet, these walls or ribs being spaced so that the heat conductive sheet will be engaged and supported at such intervals that it may be subjected to relatively high fluid pressure or pressure difference without danger of rupturing the sheet.

A further object of the invention is to provide a heat exchanger of the above character in which the heat conductive sheet lies in a sinuous path formed between separator members and side wall members, said separator members and said side wall members having fluid channels therein on opposite sides of the heat conductive sheet which follow the sheet from one end of its sinuous path to the other.

It is a further object of the invention to provide a simple and efficient means for sealing the edges of the heat conductive sheet, and also to efficiently and simply seal the ends of the heat conductive sheet against leakage.

It is a further object of the invention to provide a simple and effective means for stretching the heat conductive sheet taut between the separator plates and over the ends thereof. For this purpose I preferably provide lugs adapted to be engaged by screw members or bolts which draw the separator members against the side plates in a manner to stretch the heat conductive sheet to operative position.

It is a further object of the invention to provide a heat exchanger of the above character in which the separator plates are externally tapered in such a manner that, when they are drawn into their respective positions of operation, uniform pressure is distributed over the surfaces of the separator members engaging the heat conductive sheet in such a manner that the thickness of the heat conductive sheet is compensated for and that the procedure of assembling the heat exchanger is very materially facilitated.

A further object of the invention is to provide in a heat exchanger member a heat conductive sheet which is assembled without welding of parts and which may be readily disassembled for the purpose of cleaning or inspection, and then reassembled without welding, soldering, or brazing together any of the parts thereof.

The foregoing principal objects and advantages of the invention, and further valuable objects and advantages thereof, will be made evident throughout the following part of the specification.

Referring to the drawings, which are for illustrative purposes only,

Fig. 1 is a partly sectioned, elevational view of a preferred embodiment of my invention.

Fig. 2 is an enlarged fragmentary sectional view of the area included by the dotted line 2 of Fig. 1.

Fig. 3 is an enlarged fragmentary section taken on a plane represented by the line 3—3 of Fig. 1.

Fig. 4 is a fragmentary section on a plane represented by the line 4—4 of Fig. 3.

Fig. 5 is a fragmentary perspective view for illustrating the manner in which the heat conductive sheet is looped through a sinuous path around the separator members.

Fig. 6 is an enlarged fragmentary section taken as indicated by the line 6—6 of Fig. 1.

Fig. 7 is a fragmentary section on a horizontal plane showing an alternative form of my invention in which the heat conductive sheet is supported by ribs which are not secured to or formed integrally with the separator walls.

Fig. 8 is a fragmentary cross sectional view on a horizontal plane showing another method of forming and supporting a heat conductive sheet between supporting walls such as the separators disclosed in Figs. 1 to 6.

In the simple embodiment of my invention consisting of the heat exchanger 11 shown in the drawings, I provide a heat conductive sheet 12, a plurality of separator members 13, end members 14, and upper and lower side members 15 and 16. The separator members 13 are all of identical size and form but are alternately positioned so that approximately half of the separator members face downwardly and the other half face upwardly. As will be hereinafter clearly described, each separator member consists of a central wall 17 having one end 18 thereof flat and the other end 20 thereof cylindrical. Projecting outwardly from the central wall are parallel vertical ribs, walls, or fins 21 which are spaced apart so as to form vertical grooves 22. These ribs 21 extend from the left-hand side of the flattened end 18, or from a position indicated at 23 in Fig. 2, vertically across the left face of the wall 17 to the rounded end 20. The ribs then pass around the end 20, as indicated at 24 in Fig. 1, and from there extend vertically across the rightward face back again to the flattened end 18 so that the channels or grooves 22 formed between the ribs 21 pass vertically across one side of the plate around the rounded end of the wall 17 and then vertically across the other side wall.

As shown in Fig. 1, the separator members 13 which point downwardly are indicated by the numeral 13a, and the separator members which point upwardly are indicated by the numeral 13b. In order to simplify the construction, I employ one more separator in the group 13a than in the group 13b so that the first and last of the separators 13a have the rounded ends 20 thereof directed downwardly. The end plates 14 each include an inner wall 25 reinforced by external reinforcing ribs 26 on the outer face of the wall 25. The upper portion 27 of the wall 25 may or may not be thicker than the lower portion 28 of the wall 25, and from the lower edge 30 of the upper portion 27 of the wall 25 vertical ribs 21a extend downwardly to the lower end 31 of the lower portion 28 of the wall. The ribs 21a are so positioned that they lie opposite the ribs 21, and between them are formed grooves 22a, the upper ends of which grooves 22a connect with a horizontal opening 32 formed in a metal body or outwardly projecting wall 33. The essential feature of the separator members 13 is that the outer faces of the ribs 21 converge toward the rounded ends in order to provide a wedging action against the intervening heat conductive sheet 12.

As will be perceived, the opening or port 32 is narrow and horizontally elongated, and communicating therewith is a fitting 34 having a circular flange 35 at its outer end to which a standard pipe flange 36 may be bolted, such pipe flange being on the end of fluid piping 37. Extending inwardly from the flange 35 of the fitting 34 is a wall 38 which converges vertically and diverges horizontally so that the cross sectional area of the inner end 40 of the opening or passage defined by the wall 38 is substantially the same as the outer end of the opening 32. The inner end of the wall 38 has an elongated flange 41 thereon which fits against the outer face of the wall 33 and is bolted thereto as shown. The upper end of the wall 25 is semi-cylindrically rounded, as indicated at 42, and the lower end thereof is flat. Formed integrally with and adjacent the upper and lower ends of the wall 25 are outwardly projecting flanges 44 which are bolted to flanges 44a and 45 projecting at the ends of members 15 and 16.

The flanges 45 project outwardly at the ends of the wall 15 and also project downwardly to the outside of the upper rounded edges 42 of the walls 25 of the members 14. Adjacent the flanges 45 semi-circular grooves or channels 46 are formed in the lower face of the member 15 to receive the ends 47 of the heat conductive sheet 12 and the rounded ends 42, the ends 47 of the sheet 12 being bent over the rounded ends 42, as shown in Figs. 1 and 2. In the rounded edges 42 and the channels 46 are packing grooves or channels 81a adapted to receive packing material such as will be hereinafter designated. Between the semi-circular grooves or channels 46 are semi-circular grooves or channels 48, the number of which corresponds to the number of separator members 13b. The bottom member 16 also has a plurality of laterally extending grooves 48, the number of which corresponds to the number of separator members 13a. As best shown in Fig. 6, a plurality of semi-annular ribs 21c project from the walls of the members 15 and 16 into the lateral grooves 48, these ribs 21c having the same spacing as the ribs 21a of the separator members 13 and forming grooves 22c which connect with the ends of the grooves 22a, as shown in Fig. 2. As shown in Fig. 1, the grooves 22c of the end channels 48 of the lower side member 16 connect between the grooves 22a of the end members 14 and the grooves 22 of the end separator members 13b.

As shown best in Figs. 3, 4, 5, and 6, ribs or walls 50 project from the vertical edges or faces 51 of the separator members, these walls having small grooves 52 formed therein for receiving a sealing material. The walls or ribs 50 project from the walls 17 of the separator members 13a and 13b the same distance as the ribs 21 so that the outer faces of the ribs 21 and the ribs 50 lie in the same plane. Also, at the ends of the lateral channels 48, semi-annular walls 50a project toward the rounded semi-cylindrical ends 53 of the walls or ribs 50 and are provided with grooves 52a therein. Further, the vertical wall portions 54 in the end members 14 also have grooves 52 therein which communicate with the grooves 52a at the ends of the end channels 48 in the lower side member 16. As shown in Figs. 4 and 6, valved inlet fittings 57, such as pressure grease fittings, communicate with the grooves 52a through openings 58, thereby providing means for feeding a sealing material into the grooves under pressure, which sealing material will serve to provide a seal between the ribs 50 and 50a and the edges of the heat conductive sheet 12.

As clearly shown in the drawings, the heat conductive sheet 12 follows a sinuous path between the separator members 13a and 13b and the side members 15 and 16 and the end members 14, the foregoing members being so proportioned that a sinuous space is left between the end faces of the ribs 21, 21a, 50, and 50a to receive the heat conductive sheet 12 which is of such thickness that when the parts of the heat exchanger are assembled, the sheet 12 is tightly clamped between the ends of the ribs 21, 21a, 50, and 50a, and due to the wedging action of the separator members 13 the strips of the sheet 12 between the ribs 21 and 21a are gripped with equal pressure throughout the lengths thereof.

As shown in Figs. 1 and 2, an elongated port 62 is formed along each end of the upper side wall member 15, this port being in a position to communicate, as shown in Fig. 2, with the ends of the grooves 22 in the first and last of the separator members 13a. Connection with the outer ends of the ports 62 is formed through fittings or connections 63 which are of the same shape as the connections or fittings 34 and may have fluid transfer pipes 64 secured thereto. As shown in Figs. 1 and 3, tie bolts 68 are extended through openings 69 adjacent the edges of the end members 14 and pass across the front and rear faces of the heat exchanger, these tie bolts serving to hold the end members 14 from outward movement. Also, as shown in Figs. 1 and 5, lugs 70 are formed near the upper and lower ends of the edge faces 51 of the separator members 13a and 13b through which bolts 71 are extended, these bolts 71 passing through the edges 72 of the upper and lower side wall members 15 and 16 and serving to clamp the side wall members 15 and 16 tightly against the ends of the separator members 13a and 13b.

In one method of assembling the heat exchanger, the heat conductive sheet may be first bent around the upper cylindrical end 42 of an end member 14 and then conducted across the inner face of such end wall member, after which it is consecutively bent into position over the separator members as they are consecutively placed in position. After placing the other end member 14, the sheet is cut off to required length, and the final end thereof is folded down over the upper cylindrical end 42 of the end member 14 which has just been placed in position. The tie bolts 68 are placed and drawn up tight, after which the upper and lower side walls 15 and 16 are applied, whereupon the clamping bolts 71 are extended through the lugs 70 and the edges of the side wall members 15 and 16 and are drawn up tightly causing the ends of the separator members 13a and 13b to be drawn forcibly toward the side wall members 15 and 16, thereby compressing the cylindrically curved portions 74 of the heat conductive sheet between the semicylindrical end portions of the ribs 21 and the semi-annular ribs 21c formed in the lateral grooves 48, and also compressing the curved edges of the heat conductive sheet 12 between the semicylindrical ends 53 of the walls or ribs 50 and the semi-annular walls or ribs 50a of the upper and lower side wall members 15 and 16. An especial feature of the invention consists in making the separator members 13a and 13b tapered toward their rounded ends so that as these members are drawn by the bolts 71 in such direction that the rounded ends of the separator members are pulled into the lateral channels, there is a wedging action against the portions of the heat conductive sheet 12 lying between them, so that as the movement of the separator members tends to stretch the heat conductive sheet 12 across the faces of the ribs 21, 21a, 50, and 50a, there is also a pressure exerted against the heat conductive sheet so as to hold the sheet tightly in place and provide an effective seal at the ends thereof. When the separator members are all drawn tightly into place by means of the bolts 71, the flattened ends 18 of the separator members are in tight sealing engagement with the flat wall surfaces 79 lying between the lateral channels 46 and 48 of the upper and lower side wall members 15 and 16. After the bolts are all drawn up tight, a plastic sealing substance, such as a putty compound, permatite, or other joint-sealing mixture, is forced through the grease gun fittings 57 into the continuous channels 80 and 81 formed by the cooperating grooves 52 and 52a formed in the walls or ribs 50 and 50a, thus insuring a good seal along the edges of the heat conductive sheet 12. The channels 80, 81, and 81a may be also employed with other types of sealing means than those above described, such as metallic packing or strips of packing material including impregnated fiber, rubber, lead, or other soft material. Such strip packing is strung in the channels 80, 81, and 81a before the parts are assembled.

On opposite sides of the heat conductive sheet 12, the cooperating grooves 22, 22a, and 22c form upper and lower fluid channels 85 and 86, the upper fluid channels having their ends connected to the ports 62 and the lower fluid channels 86 having their ends connected to the ports 32. Therefore, by conducting a fluid through one of the fittings 63 into the upper fluid channels 85 and taking it from the upper fluid channels through the other of the fittings 63, and feeding a second fluid into the lower fluid channels 86 through one of the fittings 34 and taking this second fluid from the other of the fittings 34, the two fluids may be caused to flow along opposite sides of the heat conductive sheet, which is preferably sheet copper, whereby to transfer heat from one fluid to the other without contact of the fluids. In Fig. 2 arrows 87 and 88 indicate the flow of the two fluids in opposite directions through the channels 85 and 86 whereby to produce a counter-flow heat exchange. The channels 85 and 86 are relatively small, and the velocity of fluids passing therethrough is great enough to perform a scouring action which will keep the exposed surfaces of the heat conductive sheet 12 clean for a maximum period of time.

In another and preferred method of assembling the heat exchanger, the end members 14 and the separators 13b are secured in their respective positions to the lower side member 16, and the separators 13a are secured in their respective positions to the upper side member 15, thereby forming a lower part and an upper part having crosswise valleys between the separator members projecting from the respective lower and upper members 16 and 15. The sheet 12 is bent to its sinuous form and is placed over the upwardly projecting separator members and end wall members which are secured to the lower side member 16. The upper cooperating part of the heat exchanger assembly is then lowered into position on the heat conductive sheet 12 which rests upon the lower portion of the heat exchanger assembly. The bolts necessary to draw the parts together are then placed and tightened so that the wedge-shaped separator members move into interengagement along vertical planes and clamp the heat conductive sheet between the ribs 21, 21a, 50, and 50a. The wedging action, as the cooperating parts are drawn together, causes a heavy pressure to be exerted on the strip portions of the sheet 12 by the lateral faces of the ribs, this pressure being evenly distributed along the length of the ribs.

Although in the preferred form of my invention I support the heat conductive sheet by means of ribs or walls formed on the separator members 13 and the end walls 14, I nevertheless contemplate that, as shown in Fig. 7, the separator walls, as indicated by the numeral 13', may be formed without projecting ribs, and a heat conductive sheet 12' may be employed having outwardly projecting ribs 90 which engage the surfaces of the separators 13' so as to hold the heat conductive sheet 12' in centralized position and to form channels 91 on opposite sides of the sheet 12' through which fluids may be conducted. The ribs 90 are not formed integrally with the separator walls 13' and are not secured thereto. It will be recognized that these ribs may be separate strips of metal placed between the walls 13' and the sheet 12' without being integrally formed with either. In this form of the invention the edges 92 of the sheet 12' are tightly gripped by the flanges or ribs 93 which project from the edges of the separators 13', thereby securing the sheet 12' in operative position.

An additional method of supporting a heat conductive sheet between supporting or separating walls 94 is shown in Fig. 8, in which the separating walls 94 are substantially smooth on the surfaces thereof and have edge flanges 95 which project laterally into gripping engagement with the edges 96 of a heat conductive sheet 97, which heat conductive sheet is formed with longitudinal corrugations. As described relative to my preferred form, the flanges 95 may be provided with sealing means consisting of channels 98 which follow the sinuous paths defined by the edges 96 of the sheet 97. This form of the invention is suitable for heat exchange between fluids at low pressures and provides a large area of heat conductive sheet 97 as a result of the corrugations formed in the sheet 97 whereby to form fluid passages 99 on opposite sides of the sheet 97 of somewhat triangular cross section.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein, but is to be accorded the full scope of the following claims.

I claim as my invention:

1. A heat exchanger of the character described, including: a pair of end wall members; a heat conductive sheet extending from one of said end wall members to the other through a sinuous path; separator members in the valleys of said heat conductive sheet, said separator members defining the sinuous path followed by said sheet, there being parallel grooves formed in said separator members extending across one side thereof, around an end thereof, and across the opposite side thereof; and side wall members secured adjacent the ends of said separator members having U-shaped channels for connecting together the consecutive ends of the grooves formed in said separator members.

2. A heat exchanger of the character described, including: a pair of end wall members; a heat conductive sheet extending from one of said end wall members to the other through a sinuous path; separator members in the valleys of said heat conductive sheet, said separator members defining the sinuous path followed by said sheet, there being parallel grooves formed in said separator members extending across one side thereof, around an end thereof, and across the opposite side thereof; side wall members secured adjacent the ends of said separator members having U-shaped channels for connecting together the consecutive ends of the grooves formed in said separator members; and means for forcing said wall members and said separator members into pressural engagement with said sheet.

3. A heat exchanger of the character described, including: a pair of end wall members; a heat conductive sheet extending from one of said end wall members to the other through a sinuous path; separator members in the valleys of said heat conductive sheet, said separator members defining the sinuous path followed by said sheet, there being parallel grooves formed in said separator members extending across one side thereof, around an end thereof, and across the opposite side thereof; side wall members secured adjacent the ends of said separator members having U-shaped channels for connecting together the consecutive ends of the grooves formed in said separator members; and means for sealing between the edges of said sheet and said members.

4. A heat exchanger of the character described, including: a pair of end wall members; a heat conductive sheet extending from one of said end wall members to the other through a sinuous path; separator members in the valleys of said heat conductive sheet, said separator members defining the sinuous path followed by said sheet, there being parallel grooves formed in said separator members extending across one side thereof, around an end thereof, and across the opposite side thereof; side wall members secured adjacent the ends of said separator members having U-shaped channels for connecting together the consecutive ends of the grooves formed in said separator members; means for forcing said wall members and said separator members into pressural engagement with said sheet; and means for sealing between the edges of said sheet and said members.

5. A heat exchanger of the character described, including: a pair of end wall members; a heat conductive sheet extending from one of said end wall members to the other through a sinuous path; separator members in the valleys of said heat conductive sheet and defining the sinuous path followed by said sheet, said separator members each having a rounded end, and said separator members being alternately placed with their rounded ends facing in opposite directions, there being parallel grooves formed in said separator members extending across one side thereof, around the rounded end thereof, and across the opposite side thereof; side wall members secured adjacent the ends of said separator members and having lateral channels therein into which the rounded ends of said separator members extend, there being semi-annular grooves in said lateral channels for connecting together the consecutive ends of the grooves formed in said separator members; means for forcing said end wall members together into pressural engagement with said sheet; and means between the ends of said separator members and said side wall members for drawing said separator members toward said side wall members.

6. A heat exchanger of the character described, including: a pair of end wall members; a heat conductive sheet extending from one of said end wall members to the other through a sinuous path; separator members in the valleys of said heat conductive sheet and defining the sinuous path followed by said sheet, said separator members each having a rounded end and tapering toward said rounded end, and said separator members being alternately placed with their rounded ends facing in opposite directions, there being parallel grooves formed in said separator members extending across one side thereof, around the rounded end thereof, and across the opposite side thereof; side wall members secured adjacent the ends of said separator members and having lateral channels therein into which the rounded ends of said separator members extend, there being semi-annular grooves in said lateral channels for connecting together the consecutive ends of the grooves formed in said separator members; means for forcing said end wall members together into pressural engagement with said sheet; and means between the ends of said separator members and said side wall members for drawing said separator members toward said side wall members.

7. A heat exchanger of the character described, including: a thin heat conductive sheet following a sinuous path; separator members lying on opposite sides of said sheet and in the valleys of said heat conductive sheet, said separator members each having a plurality of projecting ribs adapted to engage opposite sides of said sheet forming longitudinal channels along said sheet through which fluids may be conducted in engagement with the surfaces of said sheet; members having passages connecting the consecutive ends of said channels; and means for demountably securing said members together in operative relation to said heat conductive sheet.

8. A heat exchanger of the character described, including: a thin heat conductive sheet following a sinuous path; separator members lying on opposite sides of said sheet and in the valleys of said heat conductive sheet, said separator members each having a plurality of projecting ribs adapted to engage opposite sides of said sheet forming longitudinal channels along said sheet through which fluids may be conducted in engagement with the surfaces of said sheet, and said separator members being tapered toward the bottoms of the valleys formed by said heat conductive sheet; members having passages connecting the consecutive ends of said channels; and means for demountably securing said members together in operative relation to said heat conductive sheet.

9. A heat exchanger of the character described, including: a thin heat conductive sheet bent so as to follow a sinuous path; wedge-shaped separator members extending into the valleys formed by said sheet, there being grooves to provide channels along said sheet through which fluids may be conducted in engagement with the surfaces of said sheet; wall means having passages for connecting said channels together in consecutive order; adjustable securing means adapted to force said separator members toward the bottoms of said valleys; and means for resisting movement of said separator members in a lateral direction.

EMMETT F. ANNIS.